United States Patent
Gupta et al.

(10) Patent No.: US 10,983,922 B2
(45) Date of Patent: Apr. 20, 2021

(54) SELECTING ONE OF MULTIPLE CACHE EVICTION ALGORITHMS TO USE TO EVICT A TRACK FROM THE CACHE USING A MACHINE LEARNING MODULE

(71) Applicant: INTERNATIONAL BUSINESS MACHINES CORPORATION, Armonk, NY (US)

(72) Inventors: Lokesh M. Gupta, Tucson, AZ (US); Matthew G. Borlick, Tucson, AZ (US); Kyler A. Anderson, Sahuarita, AZ (US); Kevin J. Ash, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/984,180

(22) Filed: May 18, 2018

(65) Prior Publication Data

US 2019/0354488 A1    Nov. 21, 2019

(51) Int. Cl.
*G06F 12/00* (2006.01)
*G06F 12/121* (2016.01)
*G06N 3/08* (2006.01)
*G06N 3/04* (2006.01)

(52) U.S. Cl.
CPC ............. *G06F 12/121* (2013.01); *G06N 3/08* (2013.01); *G06F 2212/1044* (2013.01); *G06N 3/0454* (2013.01)

(58) Field of Classification Search
None
See application file for complete search history.

(56) References Cited

U.S. PATENT DOCUMENTS

| | | | |
|---|---|---|---|
| 9,274,956 B1 | 3/2016 | Salyers et al. | |
| 9,747,214 B2 | 8/2017 | Bagg | |
| 10,176,103 B1* | 1/2019 | Chatterjee | G06F 12/0866 |
| 2006/0143396 A1 | 6/2006 | Cabot | |
| 2011/0296122 A1 | 12/2011 | Wu et al. | |
| 2012/0041914 A1* | 2/2012 | Tirunagari | G06F 12/121 |
| | | | 706/15 |

(Continued)

OTHER PUBLICATIONS

U.S. Appl. No. 16/053,713, filed Aug. 2, 2018.

(Continued)

*Primary Examiner* — Daniel D Tsui
(74) *Attorney, Agent, or Firm* — David W. Victor; Konrad, Raynes, Davda and Victor LLP

(57) ABSTRACT

Provided are a computer program product, system, and method for using a machine learning module to select one of multiple cache eviction algorithms to use to evict a track from the cache. A first cache eviction algorithm determines tracks to evict from the cache. A second cache eviction algorithm determines tracks to evict from the cache, wherein the first and second cache eviction algorithms use different eviction schemes. At least one machine learning module is executed to produce output indicating one of the first cache eviction algorithm and the second cache eviction algorithm to use to select a track to evict from the cache. A track is evicted that is selected by one of the first and second cache eviction algorithms indicated in the output from the at least one machine learning module.

25 Claims, 8 Drawing Sheets

(56) References Cited

U.S. PATENT DOCUMENTS

| | | | |
|---|---|---|---|
| 2012/0041941 A1* | 2/2012 | King | G06F 17/218 707/711 |
| 2013/0138889 A1 | 5/2013 | Chockler et al. | |
| 2014/0181837 A1 | 6/2014 | Vajapeyam | |
| 2015/0186274 A1 | 7/2015 | Kass | |
| 2015/0186287 A1 | 7/2015 | Kass | |

OTHER PUBLICATIONS

List of IBM Patents or Patent Applications Treated as Related, filed Aug. 3, 2018, Total 2 pp.

A. Blankstein, et al. "Hyperbolic Caching: Flexible Caching for Web Applications", Mircrosoft Research, Princeton University, 2017 {USENIX} Annual Technical Conference, pp. 13.

Anonymous, "Hybrid cache eviction policy for near caches in spatially distributed cache platforms", IP.com, IP.com No. IPCOM000234682D, Jan. 28, 2014, pp. 4.

Anonymous, "Value-Based Eviction Scheduling in Cache", P.com, IP.com No. IPCOM000246413D, Jun. 6, 2016, pp. 5.

Preliminary Amendment, dated Aug. 2, 2018, for U.S. Appl. No. 16/053,713, filed Aug. 2, 2018, Total 14 pages.

International Search Report and Written Opinion, dated Aug. 27, 2019, for International Application No. PCf/IB2019/053913, Total 9 pages.

Notice of Allowance, dated Feb. 7, 2020, for U.S. Appl. No. 16/053,713, filed Feb. 8, 2018, Total 23 pages.

\* cited by examiner

SELECTING ONE OF MULTIPLE CACHE EVICTION ALGORITHMS TO USE TO EVICT A TRACK FROM THE CACHE USING A MACHINE LEARNING MODULE

BACKGROUND OF THE INVENTION

1. Field of the Invention

The present invention relates to a computer program product, system, and method for using a machine learning module to select one of multiple cache eviction algorithms to use to evict a track from the cache.

2. Description of the Related Art

A cache management system buffers tracks in a storage device recently accessed as a result of read and write operations in a faster access storage device, such as memory, than the storage device storing the requested tracks. Subsequent read requests to tracks in the faster access cache memory are returned at a faster rate than returning the requested tracks from the slower access storage, thus reducing read latency.

A cache management system may maintain a linked list having one entry for each track stored in the cache, which may comprise write data buffered in cache before writing to the storage device or read data. A cache management system uses a cache eviction algorithm to select a track to evict from cache when space needs to be freed to make room for a track to add to the cache for a read or write request. Cache management algorithms seek to increase a cache hit-to-miss ratio, where a cache hit occurs when a read request is to a track that is in the cache and may be serviced from the faster access cache and a read miss occurs when the requested track is not in the cache. A read miss results in increased latency for a read request to stage the track from the storage into the cache to return to the request.

Different cache eviction algorithms may result in better cache hit-to-miss ratios in different operating environments and different read request track patterns.

There is a need in the art for improved techniques for selecting a cache eviction algorithm to use to evict a track from the cache to improve the cache hit-to-miss ratio in different read access patterns and workloads.

SUMMARY

A first embodiment comprises a computer program product, system, and method for using a machine learning module to select one of multiple cache eviction algorithms to use to evict a track from the cache. A first cache eviction algorithm determines tracks to evict from the cache. A second cache eviction algorithm determines tracks to evict from the cache, wherein the first and second cache eviction algorithms use different eviction schemes. At least one machine learning module is executed to produce output indicating one of the first cache eviction algorithm and the second cache eviction algorithm to use to select a track to evict from the cache. A track is evicted that is selected by one of the first and second cache eviction algorithms indicated in the output from the at least one machine learning module.

Different cache eviction algorithms may improve the cache-hit-to miss ratio under different operating conditions. Described embodiments use at least one machine learning module that produces output indicating which of the first and second cache eviction algorithms to use to select the track to evict, which would select the cache eviction algorithm that would likely have a greater positive effect on the cache hit-to-miss ratio.

In a second embodiment, the first embodiment may additionally include executing the first cache eviction algorithm to determine a first evict track to evict from the cache and executing the second cache eviction algorithm to determine a second evict track to evict from the cache. The executed at least one machine learning module receives as input the first and the second evict tracks and cache statistics to produce output used to select one of the first and the second cache eviction algorithms to use to select a track to evict from the cache.

With the second embodiment, the at least one machine learning algorithm is provided the first and second evict tracks that the first and second cache eviction algorithms would select to evict and cache statistics to use to determine which of the selected first and second evict tracks to evict would have the most improvement on the cache hit-to-miss ratio.

In a third embodiment, the second embodiment may additionally include that executing the at least one machine learning module comprises executing a first machine learning module that receives as input the first evict track and cache statistics and outputs a first confidence level indicating a likelihood that the first cache eviction algorithm optimizes a read hit rate to the cache and executing a second machine learning module that receives as input the second evict track and cache statistics and outputs a second confidence level indicating a likelihood that the second cache eviction algorithm optimize the read hit rate to the cache. The first evict track is evicted from the cache in response to the first confidence level exceeding the second confidence level and the second evict track is evicted from the cache in response to the second confidence level exceeding the first confidence level.

With the third embodiment, a first and second machine learning algorithms are trained to estimate a confidence level indicating a likelihood that the cache eviction algorithm associated with the machine learning algorithm will optimize the read hit rate to the cache. The track selected by the cache eviction algorithm having the highest confidence level is then evicted from the cache to use the cache eviction algorithm providing the optimal result for increasing the read hit rate, i.e., minimizing the cache miss rate. In this way, computer technology for cache eviction is improved by using the cache eviction algorithm to select a particular track to evict that will have the best effect on the read hit rate and minimize the cache miss ratio, as indicated by the relative confidence levels produced by the machine learning algorithms.

A fourth embodiment comprises a computer program product, system, and method for demoting tracks from cache to a storage. A first cache eviction algorithm is executed to determine a first evict track to evict from the cache. A second cache eviction algorithm is executed to determine a second evict track to evict from the cache, wherein the first and second cache eviction algorithms use different eviction schemes. At least one machine learning module is executed that receives as input the first evict track, the second evict track and cache statistics and produces output used to select one of the first and the second cache eviction algorithms to use to select a track to evict from the cache. The first evict track is evicted from the cache in response to the output from the at least one machine learning module indicating to use the first cache eviction algorithm. The second evict track is evicted from the cache in response to the output from the at least one machine learning module indicating to use the second cache eviction algorithm.

The fourth embodiment provides improvements to the computer technology for selecting a track to evict by having at least one machine learning module consider the tracks that would be selected to evict by different possible cache eviction algorithms and cache statistics to determine which cache eviction algorithm at that particular moment would select a track to evict that would be most likely to have a better effect on the cache hit-to-miss ratio, i.e., select a track to evict that would be less likely to be requested in the near future.

In a fifth embodiment, the fourth embodiment additionally includes that the output from the at least one machine learning module comprises a first confidence level indicating a likelihood that the first cache eviction algorithm optimizes a read hit rate to the cache and a second confidence level indicating a likelihood that the second cache eviction algorithm optimize the read hit rate to the cache. The output indicates to use the first cache eviction algorithm in response to the first confidence level exceeding the second confidence level. The output indicates to use the second cache eviction algorithm in response to the second confidence level exceeding the first confidence level.

With the fifth embodiment at least one machine learning algorithm is used to generate confidence levels for different cache eviction algorithms that may be used to select a track to evict. The confidence levels indicate which cache eviction algorithm at the moment, based on the track it suggests to evict and current cache statistics, would likely optimize the cache read hit rate and be the best cache eviction algorithm to improve cache performance.

In a sixth embodiment, the fourth embodiment additionally includes that the at least one machine learning module comprises a first machine learning module that receives as input the first evict track and outputs the first confidence level and a second machine learning module that receives as input the second evict track and outputs the second confidence level. An active cache list indicates the tracks in the cache and an inactive cache list indicates tracks evicted from the cache. Indication of a track is removed from the active cache list when the track is evicted from the cache. Indication of the track evicted from the cache is added to the inactive cache list. In response to a read request to a requested track not indicated in the active cache list and indicated in the inactive cache list, a modified first confidence level is determined based on first information on the requested track in the inactive cache list. A modified second confidence level is determined based on second information on the requested track in the inactive cache list. The first machine learning module is retrained to produce the modified first confidence level for the requested track. The second machine learning module is retrained to produce the modified second confidence level for the requested track.

With the sixth embodiment, an inactive cache list is used to maintain information on tracks evicted from cache. If there is a read miss, then a modified first confidence level and second confidence level are determined based on first information and second information on the requested track in the inactive cache list having information on evicted tracks. For instance, if the information for the requested track in the inactive cache list indicates the track is more likely to be selected by the cache eviction algorithm, then the confidence level produced by the machine learning module for that cache eviction algorithm for that requested track and cache statistics is increased to increase the likelihood that that cache eviction algorithm is selected because it is more likely to select the requested track. On the other hand, if the information for the requested track in the inactive cache list indicates the track is less likely to be selected by the cache eviction algorithm, then the confidence level produced by the machine learning module for that requested track and cache statistics is reduced to reduce the likelihood that that cache eviction algorithm is selected because it is less likely to select the requested track. In this way, the machine learning modules are retrained based on a requested track resulting in a cache miss to produce a confidence level more likely to select a cache eviction algorithm that would likely select the requested track and produce a confidence level less likely to select a cache eviction algorithm that would be less likely to select the requested track. In this way, the confidence levels are adjusted to increase the likelihood that the cache eviction algorithm that would select the requested track resulting in the cache miss is used so as to reduce cache misses in the future and improve the hit-to-miss ratio.

DETAILED DESCRIPTION

A storage controller demotes tracks from an active cache to make room to cache data for new I/O requests, e.g., read or write requests. If the data for a read request is already in the cache, i.e., a cache hit, then the requested data does not need to be staged into the cache. If the data for the read request is not in the cache, i.e., a cache miss, or if there is write data for the request, then tracks in the cache may need to be evicted from the cache to make space for the read data to stage into cache or the write data. Tracks are evicted based on cache eviction algorithms. If the cache miss rate is high, data needs to be continually staged from storage into the cache, and then new I/O requests will need to be queued until space is freed in the cache. Such queuing of I/O requests can cause severe performance problems and high response times to the queued I/O requests.

Described embodiments provide improvements to computer technology for evicting a track from a cache by providing a first and second cache eviction algorithms and executing at least one machine learning module to produce output indicating one of the first cache eviction algorithm and the second cache eviction algorithm to use to select a track to evict from the cache to improve the cache hit-to-miss ratio that will maximize the cache hit-to-miss ratio, and minimize read latency. Described embodiments provide improvements for selecting a cache eviction algorithm to use to determine the track to evict by using machine learning modules to process the requested track and determine the cache eviction algorithm that will best optimize the cache hit-to-miss ratio by using machine learning optimization techniques. In this way, described embodiments improve the selection of a cache eviction algorithm to use to evict a track by considering which cache eviction algorithm has the highest confidence value, or more likely to increase the hit-to-miss ratio and reduce the number of cache misses.

Figure 1:
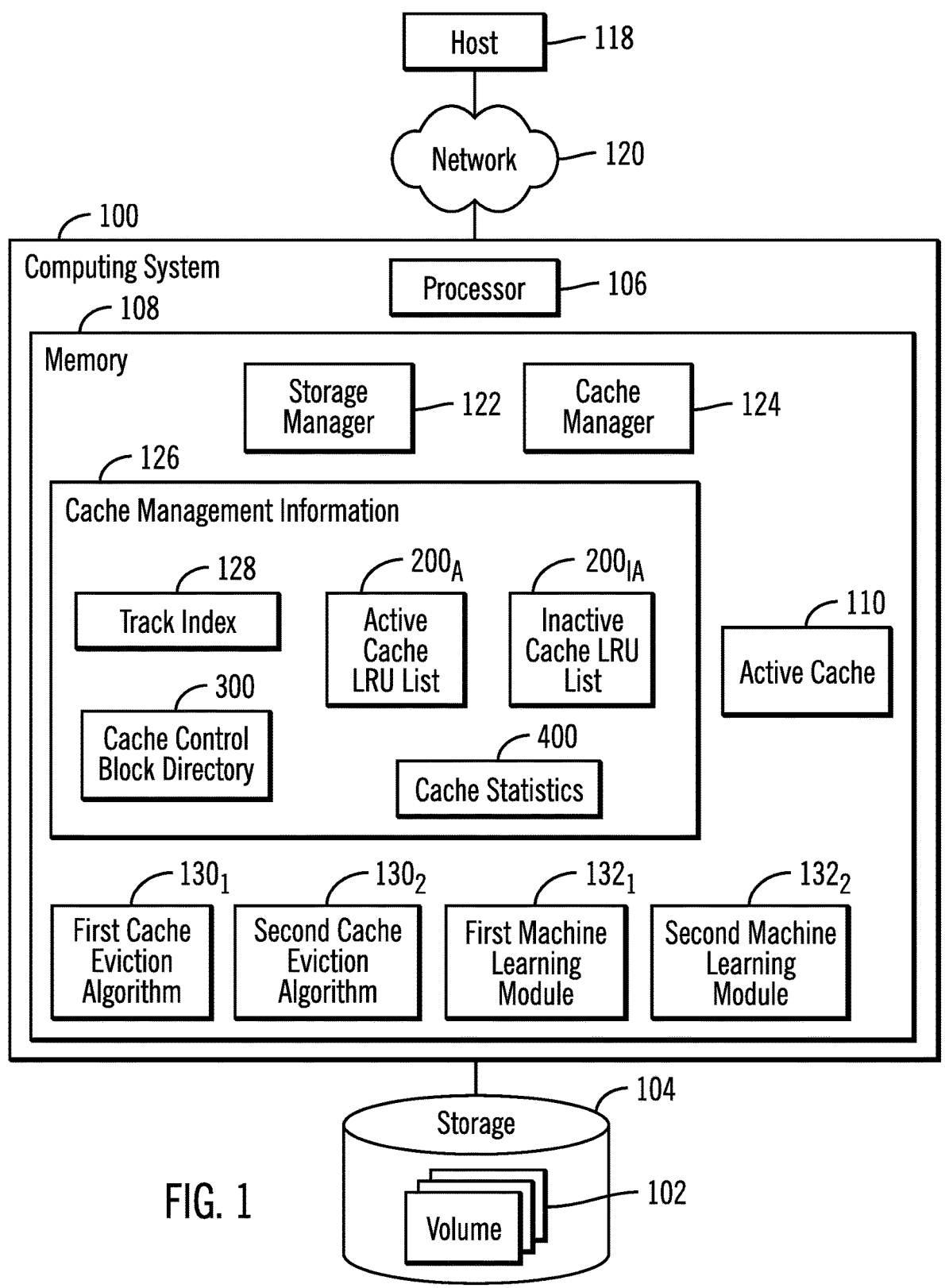
FIG. 1 illustrates an embodiment of a computing environment.

FIG. 1 illustrates an embodiment of a computing environment. A computing system 100 accesses data in volumes 102 (e.g., Logical Unit Numbers, Logical Devices, Logical Subsystems, etc.) configured in a storage 104. The computing system 100 includes a processor 106 and a memory 108, including an active cache 110 to cache data for the storage 104. The processor 106 may comprise one or more central processing units (CPUs) or a group of multiple cores on a single CPU. The active cache 110 buffers data requested by processes within the computing system. Alternatively, the computing system 100 may comprise a storage controller that processes Input/Output (I/O) access requests for tracks in the storage 104 from hosts 118 connecting to the computing system 100 (storage controller) over a network 120.

The memory 108 further includes a storage manager 122 and cache manager 124. The storage manager 122 manages access requests from internal processes in the computing system 100 and/or from hosts 118 for tracks in the storage 104. The cache manager 124 maintains accessed tracks in the active cache 110 for future read access to the tracks to allow the accessed tracks to be returned from the faster access cache 110 instead of having to retrieve from the storage 104. A track may comprise any unit of data configured in the storage 104, such as a track, Logical Block Address (LBA), etc., which is part of a larger grouping of tracks, such as a volume, logical device, etc.

The cache manager 124 maintains cache management information 126 in the memory 108 to manage read (unmodified) and write (modified) tracks in the cache 110. The cache management information 126 may include a track index 128 providing an index of tracks in the cache 110 to cache control blocks in a control block directory 300; an active cache Least Recently Used (LRU) list $200_A$ for tracks in the active cache 110 and an inactive cache LRU list $200_{IA}$ to indicate tracks that have been evicted from the active cache 110 for purposes of tracking cache access to optimize cache eviction algorithms. The control block directory 300 includes the cache control blocks, where there is one cache control block for each track in the cache 110 providing metadata on the track in the cache 110. The track index 128 associates tracks with the cache control blocks providing information on the tracks in the cache 110. Upon determining that the active cache LRU list $200_A$ is full or has reached a threshold level, the active cache LRU list $200_A$ is used to determine tracks to evict from the cache.

In one embodiment, cache control blocks are maintained for tracks indicated in the active cache LRU list $200_A$ and in the inactive cache LRU list $200_{IA}$, with the difference being the track data for tracks indicated in the inactive cache LRU list $200_{IA}$ may not be stored in the cache 110 as they have been evicted from cache 110. In a still further alternative embodiment, the cache control blocks used for tracks in the inactive cache LRU list $200_{IA}$ may have fewer fields and less information than those for tracks maintained in the cache 110, such that a cache control block for a track indicated on the inactive LRU cache list $200_{IA}$ may require less data. In a further embodiment, data for tracks in the inactive cache LRU list $200_{IA}$ may be stored in a ghost cache.

The memory 108 further includes a first cache eviction algorithm $130_1$ and a second cache eviction algorithm $130_2$ that provide different algorithms for selecting tracks to evict. For instance, in one embodiment the first cache eviction algorithm $130_1$ may comprise a Least Recently Used (LRU) algorithm that selects a track at the LRU end of the active cache LRU list $200_A$ to evict, or cache that is the least recently accessed in the cache 110 to evict. The active cache LRU list $200_A$ may comprise a double linked list to track the access order. If a track is added to the cache 110, then an entry for the added track is added to the most recently used (MRU) end of the active cache LRU list $200_A$. If a track is accessed or updated that is already in the cache 110, then the entry for that track in the active cache LRU list $200_A$ is moved to the MRU end of the list $200_A$. When the cache 110 reaches its maximum size the track indicated at the LRU end, least recently used or accessed, will be evicted from the cache 110.

The second cache eviction algorithm $130_2$ may comprise a least frequently used (LFU) algorithm that evicts a track that is least frequently used or fewest number of accesses while in cache 110, where the cache control blocks 300 for the tracks indicate a frequency counter indicating a number of times the track was accessed while in the active cache 110. In further embodiments, the first $130_1$ and/or second $130_2$ cache eviction algorithm may implement alternative cache eviction techniques, such as adaptive replacement cache (ARC), clock with adaptive replacement (CAR), LFU with dynamic aging (LFUDA), low inter-reference recency set (LIRS), time aware least recently used (TLRU), most recently used (MRU), pseudo-LRU (PLRU), random replacement (RR), segmented LRU (SLRU), Bélády's algorithm, First in first out (FIFO), Last in first out (LIFO), Multi-queue (MQ), etc.

The memory 108 may further implement a first machine learning module $132_1$ and a second machine learning module $132_2$, which implement a machine learning technique such as decision tree learning, association rule learning, neural network, inductive programming logic, support vector machines, Bayesian models, etc., to determine a confidence level indicating a likelihood that the eviction algorithm associated with the machine learning algorithm selects a track to evict that optimizes the hit-to-miss ratio to increase the likelihood that a requested track to access is in the active cache 110. For instance, the first machine learning module $132_1$ may receive as input the track determined by the first cache eviction algorithm $130_1$ to evict and cache statistics to produce a first confidence level that the first cache eviction algorithm $130_1$, such as an LRU eviction algorithm, will select a track to evict that maximizes the hit-to-miss ratio. The second machine learning module $132_2$ may receive as input the track determined by the second cache eviction algorithm $130_2$ to evict and cache statistics to produce a second confidence level that the second cache eviction algorithm $130_2$, such as an LFU eviction algorithm, will select a track to evict that maximizes the hit-to-miss ratio. The cache manager 124 may then use the outputted first and second confidence levels to select the selected track to evict from the first $130_1$ or the second $130_2$ cache eviction algorithm.

In one embodiment, the first $132_1$ and the second $132_2$ machine learning algorithms may comprise separate artificial neural network programs. The first neural network $132_1$ may be trained using backward propagation to adjust weights and biases at nodes in a hidden layer of the first artificial neural network program to produce a desired first confidence level based on input comprising a track to evict from the first evict cache algorithm $130_1$ and the cache statistics. The second neural network $132_2$ may be trained using backward propagation to adjust weights and biases of nodes in a hidden layer of the second artificial neural network program to produce a desired second confidence level based on input comprising a track to evict from the second evict cache algorithm $130_2$ and the cache statistics. In back propagation, the margin of error of the output is measured and the weights and biases at nodes in the hidden layer are adjusted accordingly to decrease the error. Back propagation may comprise an algorithm for supervised learning of artificial neural networks using gradient descent. Given an artificial neural network and an error function, the method may calculate the gradient of the error function with respect to the neural network's weights and biases.

During caching operations, the cache manager 124 may gather for specific intervals of time, such as 15 second intervals, cache access statistics 400, such as cache hit-to-miss ratio for the currently used cache 110 and a cache size.

Although FIG. 1 shows two cache eviction algorithms and two machine learning modules, in further embodiments there may be more than two cache eviction algorithms and two machine learning modules. Further, instead of a separate machine learning module $132_1$ to determine a confidence level for each of the cache eviction algorithms $130_1$, one machine learning module 132 may be used to select a cache eviction algorithm to use based on input of the track to evict selected by the cache eviction algorithms $130_1$, $130_2$ and cache statistics 400.

In the described embodiments, the lists $200_A$ and $200_{IA}$ comprise LRU lists. In alternative embodiments, the lists $200_A$ and $200_{IA}$ may comprise other types of lists to organize indication of tracks in the cache 110.

The storage manager 122, cache manager 124, the first cache eviction algorithm $130_1$, the second cache eviction algorithm $130_2$, the first machine learning module $132_1$, and the second machine learning module $132_2$ are shown in FIG. 1 as program code loaded into the memory 108 and executed by the processor 106. Alternatively, some or all of the functions may be implemented in hardware devices in the system 100, such as in Application Specific Integrated Circuits (ASICs) or executed by separate dedicated processors.

The storage 104 may comprise one or more storage devices known in the art, such as a solid state storage device (SSD) comprised of solid state electronics, EEPROM (Electrically Erasable Programmable Read-Only Memory), flash memory, flash disk, Random Access Memory (RAM) drive, storage-class memory (SCM), Phase Change Memory (PCM), resistive random access memory (RRAM), spin transfer torque memory (STM-RAM), conductive bridging RAM (CBRAM), magnetic hard disk drive, optical disk, tape, etc. The storage devices may further be configured into an array of devices, such as Just a Bunch of Disks (JBOD), Direct Access Storage Device (DASD), Redundant Array of Independent Disks (RAID) array, virtualization device, etc. Further, the storage devices may comprise heterogeneous storage devices from different vendors or from the same vendor.

The memory 108 may comprise a suitable volatile or non-volatile memory devices, including those described above.

In certain embodiments, the active cache 110 comprises a cache to store tracks immediately from the storage 104. In alternative embodiments, the described cache eviction techniques herein using multiple cache eviction algorithms $130_1$, $130_2$ and machine learning modules $132_1$, $132_2$ may be used to evict tracks from processor caches, such as L1 and L2 caches, a last level cache, and other caches in the system 100.

The network 120 may comprise a Storage Area Network (SAN), a Local Area Network (LAN), a Wide Area Network (WAN), the Internet, and Intranet, etc.

Figure 2:
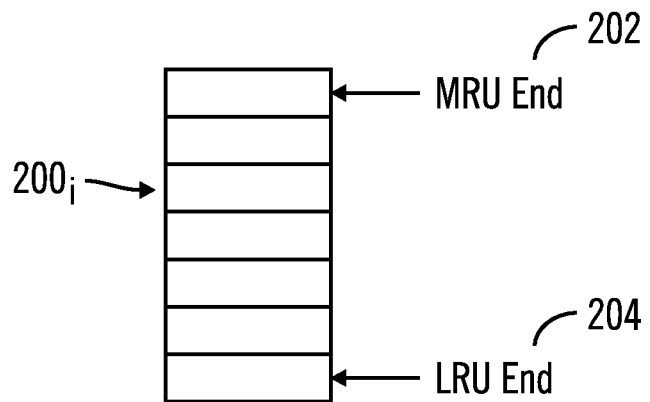
FIG. 2 illustrates an embodiment of a Least Recently Used (LRU) list.

FIG. 2 illustrates an embodiment of one of the LRU lists $200_1$, such as LRU cache lists $200_A$ and $200_{IA}$, as having a most recently used (MRU) end 202 identifying a track most recently added to the cache 110 or most recently accessed in the cache 110 and a least recently used (LRU) end 204 from which the track identified at the LRU end 204 is selected to demote from the cache 110. The LRU end 204 points to a track identifier, such as a track identifier address or a cache control block index for the track, of the track that has been in the cache 110 the longest for tracks indicated in that list $200_A$. The inactive cache LRU list $200_{IA}$ indicates tracks demoted from the cache 110.

Figure 3:
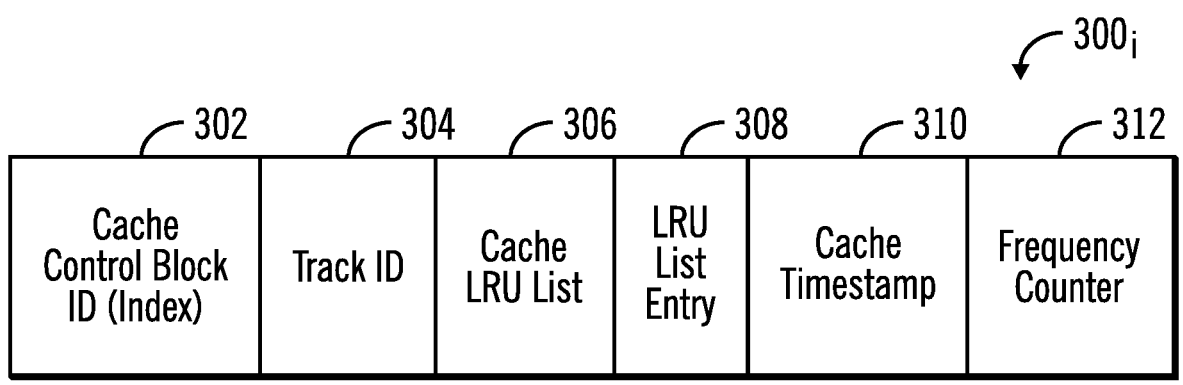
FIG. 3 illustrates an embodiment of a cache control block.

FIG. 3 illustrates an embodiment of a cache control block $300_1$ for one of the tracks in the active cache 110, including, but not limited to, a cache control block identifier 302, such as an index value of the cache control block $300_1$; a track ID 304 of the track in the storage 104; the cache LRU list 306 in which the cache control block $300_1$ is indicated; an LRU list entry 308 at which the track is indicated; a cache timestamp 310 indicating a time the track was added to the cache 110 and indicated on the LRU list 304; and a frequency counter 312 indicating a number of times the track 304 was accessed while the track was in the active cache 110. While on the inactive cache LRU list $200_{IA}$, the frequency counter 312 will not be updated, unless the track indicated in the inactive cache LRU list $200_{IA}$ is moved back to the active cache LRU list $200_A$.

Figure 4:
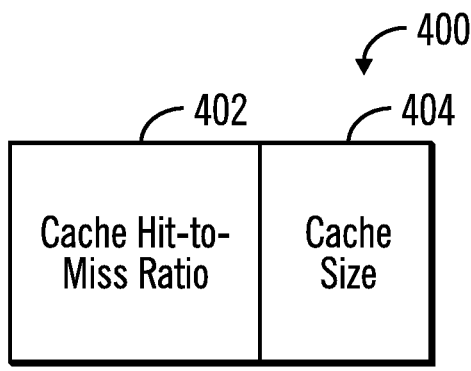
FIG. 4 illustrates an embodiment of cache statistics.

FIG. 4 illustrates an embodiment of time interval cache statistics 400 gathered for one time interval. The cache manager 124 may gather cache access statistics for time intervals within a large time period during caching operations. The time interval cache access statistics $400_1$ include a cache hit-to-miss ratio 402 indicating the number of hits as a ratio of hits and misses and a cache size 404 of an amount of cache consumed by tracks. Other statistics may also be gathered.

Figure 5A:
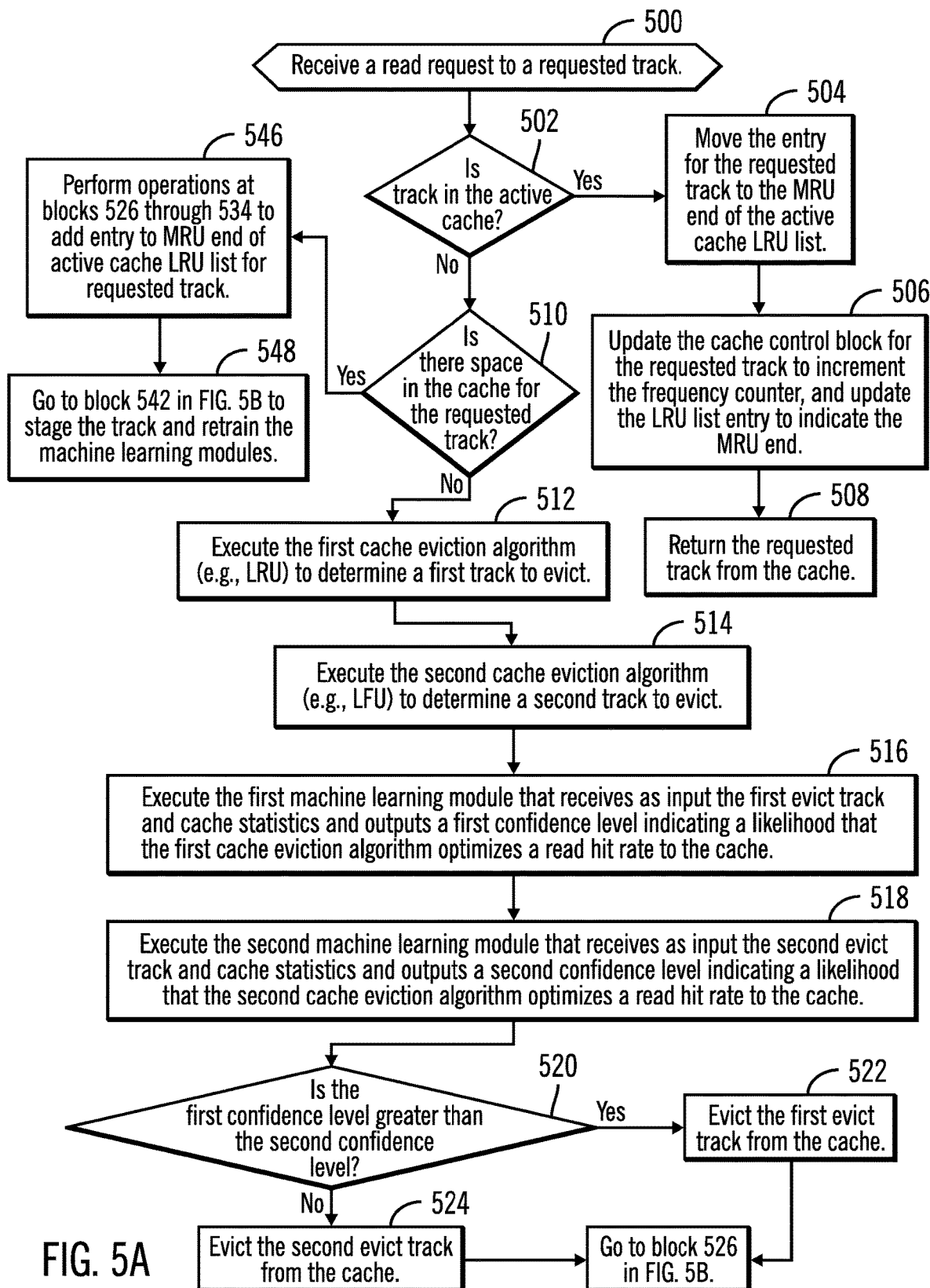
FIGS. 5a and 5b illustrate an embodiment of operations to process a read request to a track.
Figure 5B:
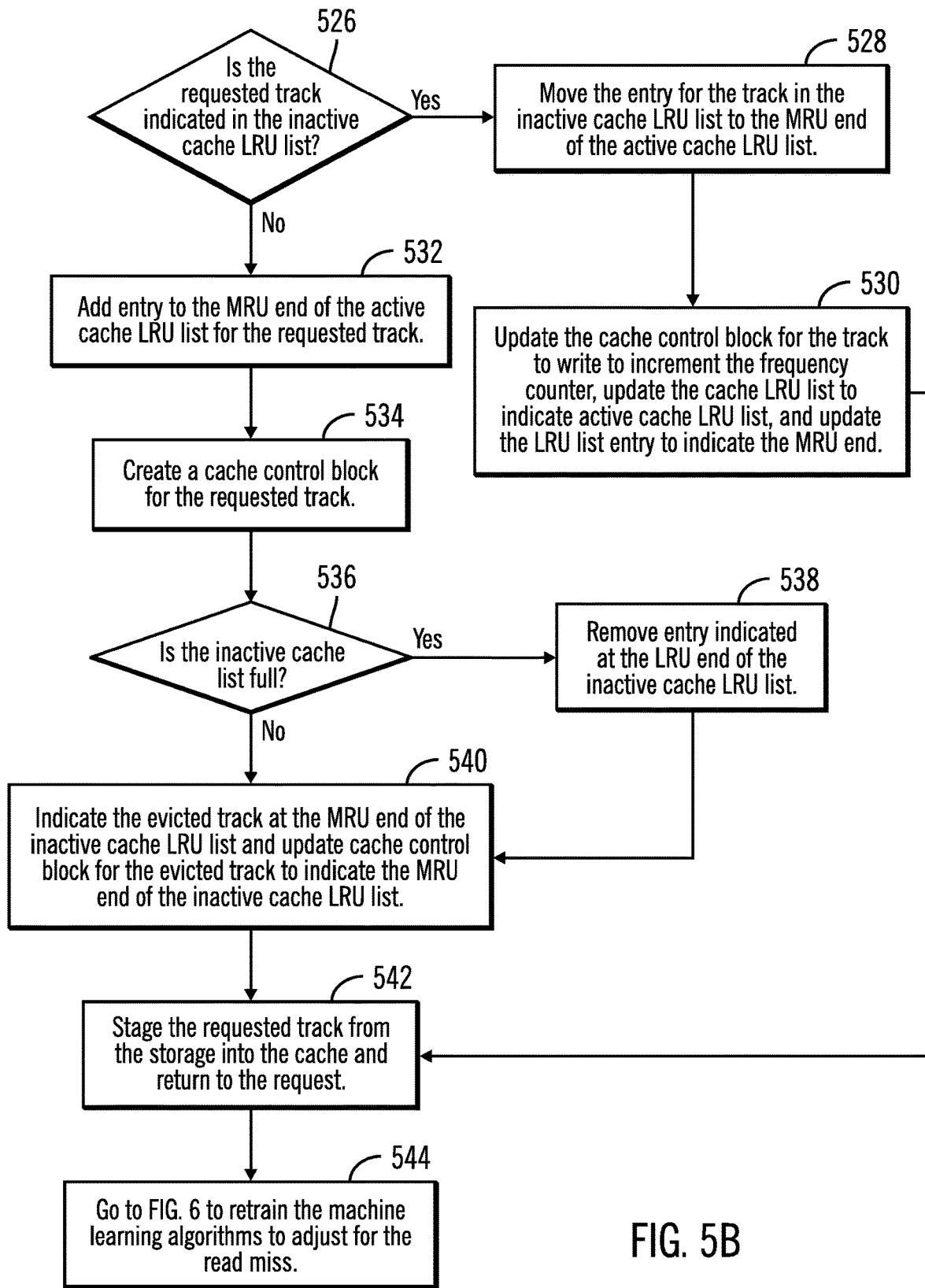

FIGS. 5a and 5b illustrate an embodiment of operations performed by the cache manager 124 to use the machine learning modules $132_1$ and $132_2$ to determine a cache eviction algorithm $130_1$ and $130_2$ to use to select a track to evict from the cache 110 to make room in cache 110 for a track to stage from the storage 104 to return to a read request from a host 118. Upon receiving (at block 500) the read request, if (at block 502) the requested track to read is in the active cache LRU list $200_A$, then the entry $200_{RT}$ for the requested track (RT) is moved (at block 504) to the MRU end 202 of the active cache LRU list $200_A$. The cache control block $300_{RT}$ for the requested track is updated (at block 506) to increment the frequency counter 312 and update the LRU list entry 308 to indicate the MRU end 202. The cached requested track is returned (at block 508) from the cache 110 to the host 118 requesting the track.

If (at block 502) the track is not in the cache 110 and if (at block 510) there is not sufficient space in the cache 110 for the requested track then control proceeds to block 512 to initiate the process to select a track to evict by the first $130_1$ or second $130_2$ cache eviction algorithms. At block 512, the cache manager 124 invokes execution of the first cache eviction algorithm $130_1$ (e.g., LRU) to determine a first track to evict and invokes execution (at block 514) of the second cache eviction algorithm $130_2$ (e.g., LFU) to determine a second track to evict.

The cache manager 124 may then invoke to execute (at block 516) the first machine learning module $132_1$ that receives as input the first evict track, i.e., first track to evict, and cache statistics 400 and outputs a first confidence level indicating a likelihood that the first cache eviction algorithm $130_1$ optimizes a read hit-to-miss rate at the cache 110. The cache manager 124 invokes to execute (at block 518) the second machine learning module $132_2$ that receives as input the second evict track, i.e., second track to evict, and cache statistics 400 and outputs a second confidence level indicating a likelihood that the second cache eviction algorithm $130_2$ optimizes a read hit rate to the cache 110. If (at block 520) the first confidence level is greater than the second confidence level, then the cache manager 124 evicts (at block 522) the first evict track from the cache 110, selected by the first machine learning module $132_1$. Otherwise, if (at block 520) the second confidence level is greater, the second evict track is evicted (at block 524) from the cache 110, as selected by the second machine learning module $132_2$.

The operations at blocks 512-524 to evict a track from cache 110 may also be used to free room in the cache 110 for a write request to a track not already in the cache.

With respect to FIG. 5b, after the track is evicted (at block 522 or 524), if (at block 526) the requested track is indicated in the inactive LRU cache list $200_{LA}$, then the entry for the requested track $200_{RT}$ in the inactive cache LRU list $200_{LA}$ is moved (at block 528) to the MRU end 202 of the active cache LRU list $200_A$. The cache control block $300_{RT}$ for the requested track is updated (at block 530) to increment the frequency counter 312, update the cache LRU list 306 to indicate active LRU cache list $200_A$, and update the LRU list entry 308 to indicate the MRU end 202.

If (at block 526) the requested track is not in inactive cache LRU list $200_{LA}$, then the cache manager 124 adds (at block 532) an entry to the MRU end 202 of the active cache LRU list $200_A$ for the requested track and creates (at block 534) a cache control block $300_{RT}$ for the requested track, with a frequency counter 312 of one, and indicate the active cache LRU list $200_A$ and MRU end 202 in fields 306 and 308, respectively, of the cache control block $300_{RT}$. If (at block 536) the inactive cache LRU list $200_{LA}$ is full, then an entry at the LRU end 204 of the inactive cache LRU list $200_{LA}$ is removed (at block 538). If (at block 536) the inactive cache LRU list $200_{LA}$ is not full or after the entry is removed (at block 538), the cache manager 124 indicates (at block 540) the evicted track at the MRU end 202 of the inactive cache LRU list $200_{LA}$ and updates the cache control block $300_{ET}$ for the evicted track (ET) to indicate the inactive cache LRU list $200_{LA}$ and MRU end 202 in fields 306 and 308, respectively, of the cache control block $300_{ET}$.

From block 540 or 530, the requested track is staged into the cache 110 and returned (at block 542) to the requesting host 118. Control then proceeds (at block 544) to FIG. 6 to retrain the machine learning algorithms $132_1$, $132_2$ to adjust for the read miss to the requested track.

If (at block 510) the requested track is not in the cache 110 and there is space in the cache 110 for the requested track, then the cache manager 124 performs (at block 546) the operations at blocks 526 to 534 to have the requested track indicated at the MRU end 202 of the active LRU cache list $200_A$ for situations where the requested track is or is not in the inactive LRU cache list $200_{LA}$. The cache manager 124 then proceeds (at block 548) to block 542 in FIG. 5b to stage the requested track into the cache 110 and retrain the machine learning modules $132_1$, $132_2$ to address the cache miss.

With the embodiments of FIGS. 5a and 5b, machine learning algorithms are used to determine confidence levels for the different cache eviction algorithms so that the cache eviction algorithm having the highest confidence level for selecting a track to evict is used to select the track to evict, where the confidence level indicates the likelihood the cache eviction algorithm is selecting a track to evict to optimize the cache hit-to-miss ratio that will minimize cache misses, or maximize cache hits.

Figure 6:
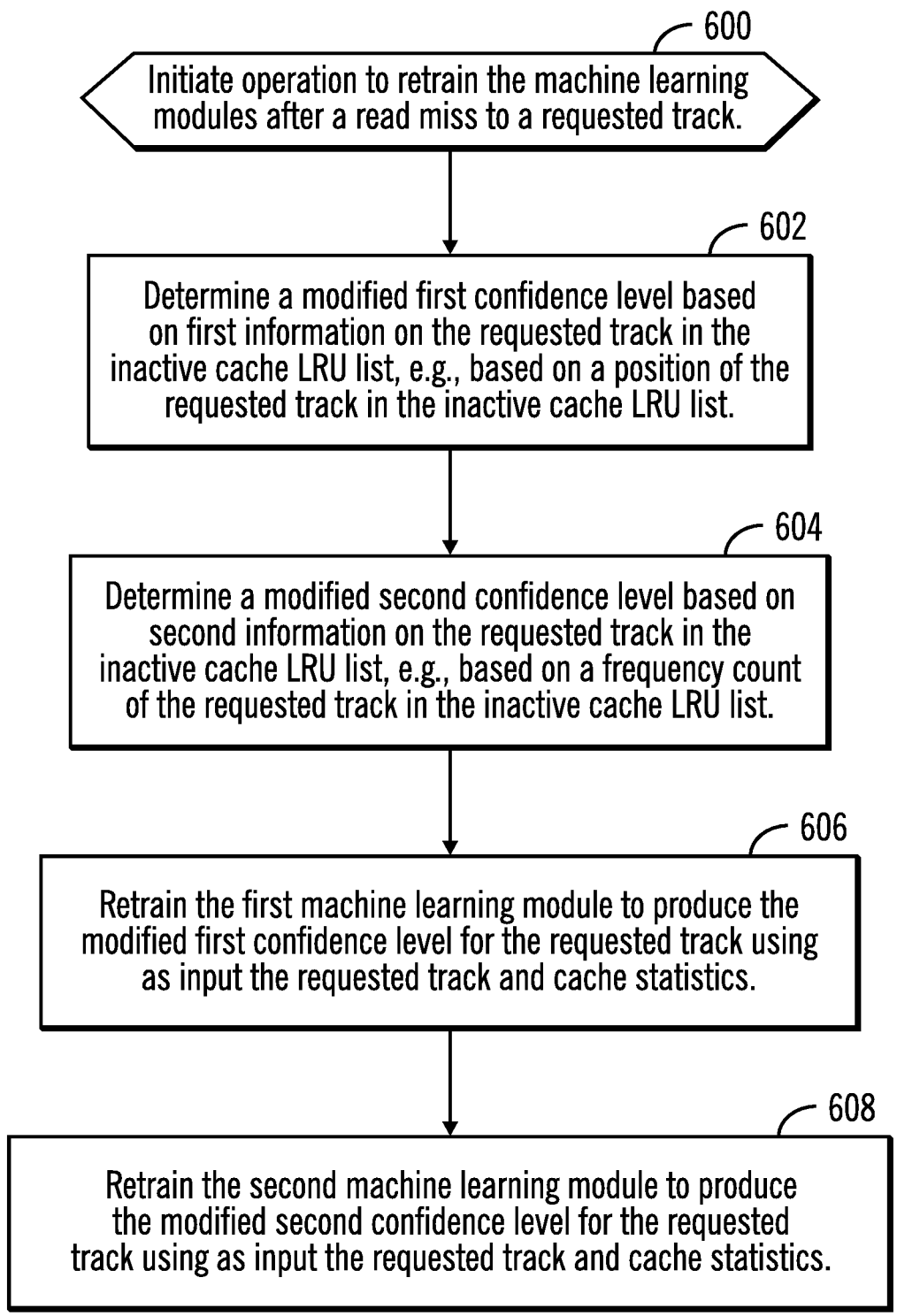
FIG. 6 illustrates an embodiment of operations to retrain machine learning algorithms for a read miss.

FIG. 6 illustrates an embodiment of operations performed by the machine learning modules $132_1$ and $132_2$, or another component such as the cache manager 124, to retrain the machine learning modules $132_1$, $132_2$ predictive algorithms if there is a read miss to a requested track. Upon initiating (at block 600) the operation to retrain the machine learning algorithms $132_1$, $132_2$, the first machine learning module $132_1$ determines (at block 602) a modified first confidence level based on first information on the requested track in the inactive cache list, e.g., based on a position of the requested track in the inactive cache list. In one embodiment, where the first cache eviction algorithm $130_1$ comprises an LRU eviction algorithm, the first confidence level is increased in response to the requested track being closer to the MRU end 202 of the inactive LRU cache list $200_{LA}$ than the LRU end 204, which means the cache miss was to a track that was relatively high in the inactive cache LRU list $200_{LA}$. If the requested track is closer to the LRU end 204 than the MRU end 202, then the first confidence level may be decreased, because the track accessed at a level below average of the tracks recorded in the inactive LRU cache list $200_{LA}$.

The second machine learning module $132_2$ determines (at block 604) a modified second confidence level based on second information on the requested track in the inactive cache list, e.g., based on a frequency counter 312 of the requested track in the inactive cache list. In an embodiment where the second cache eviction algorithm $130_2$ comprises a LFU algorithm to evict a least frequently used track based on the frequency counter 312, the second confidence level is increased in response to the frequency counter value of the requested track being greater than the average of the frequency counter values of the tracks in the inactive cache list, which means the LFU eviction algorithm would produce a better result given the requested track has a greater than average frequency counter value. The second confidence level may be decreased in response to the frequency counter value of the requested track being less than the average of the frequency counter values of the tracks in the inactive cache list, because in such case the LFU eviction algorithm would not produce a good eviction result for the requested track, which has a less than average frequency counter 312, meaning the requested track is less likely to be a qualified track for selection based on the frequency of access predictor.

After determining a modified first and second confidence levels, the machine learning modules $132_1$, $132_2$ may then use those values to retrain the first $132_1$ and second $132_2$ machine learning module algorithms to produce the modified first and second confidence levels, respectively, for the requested track that resulted in a cache miss. The first machine learning module $132_1$ may retrain (at block 606) the first machine learning module $132_1$ algorithm, such as the weights and biases at the nodes of the hidden layer using back propagation to reduce the margin of error, to produce the modified first confidence level for the requested track using as input the requested track and cache statistics 400. The second machine learning module 132$_2$ further retrains (at block 608) the second machine learning module 132$_2$ to produce the modified second confidence level for the requested track using as input the requested track and cache statistics.

In embodiments where the machine learning modules 132$_1$ and/or 132$_2$ predictive algorithms comprise neural networks, the cache manager 124 may invoke a backward propagation routine to retrain the machine learning modules to produce the modified first and second confidence levels. For other types of machine learning algorithms, such as Bayesian models, other techniques may be used to retrain the machine learning modules 132$_1$, 132$_2$ to produce the modified confidence levels base4d on the input.

With the embodiments of FIG. 6, the machine learning modules 132$_1$, 132$_2$ are retrained in response to a read miss by adjusting the confidence levels produced for the missed track using information on access to the requested track maintained in the inactive LRU cache list 200$_{LA}$, including a position of the requested track in the inactive LRU cache list 200$_{LA}$ and a frequency counter value for the requested track. This allows for real time adjustment to improve the predictability of the machine learning algorithms 132$_1$, 132$_2$ based on information on an immediate cache miss for a requested track to improve the predictability of the machine learning algorithms in selecting a cache eviction algorithm to evict a track from the track to make room for the requested track that resulted in the miss.

Figure 7:
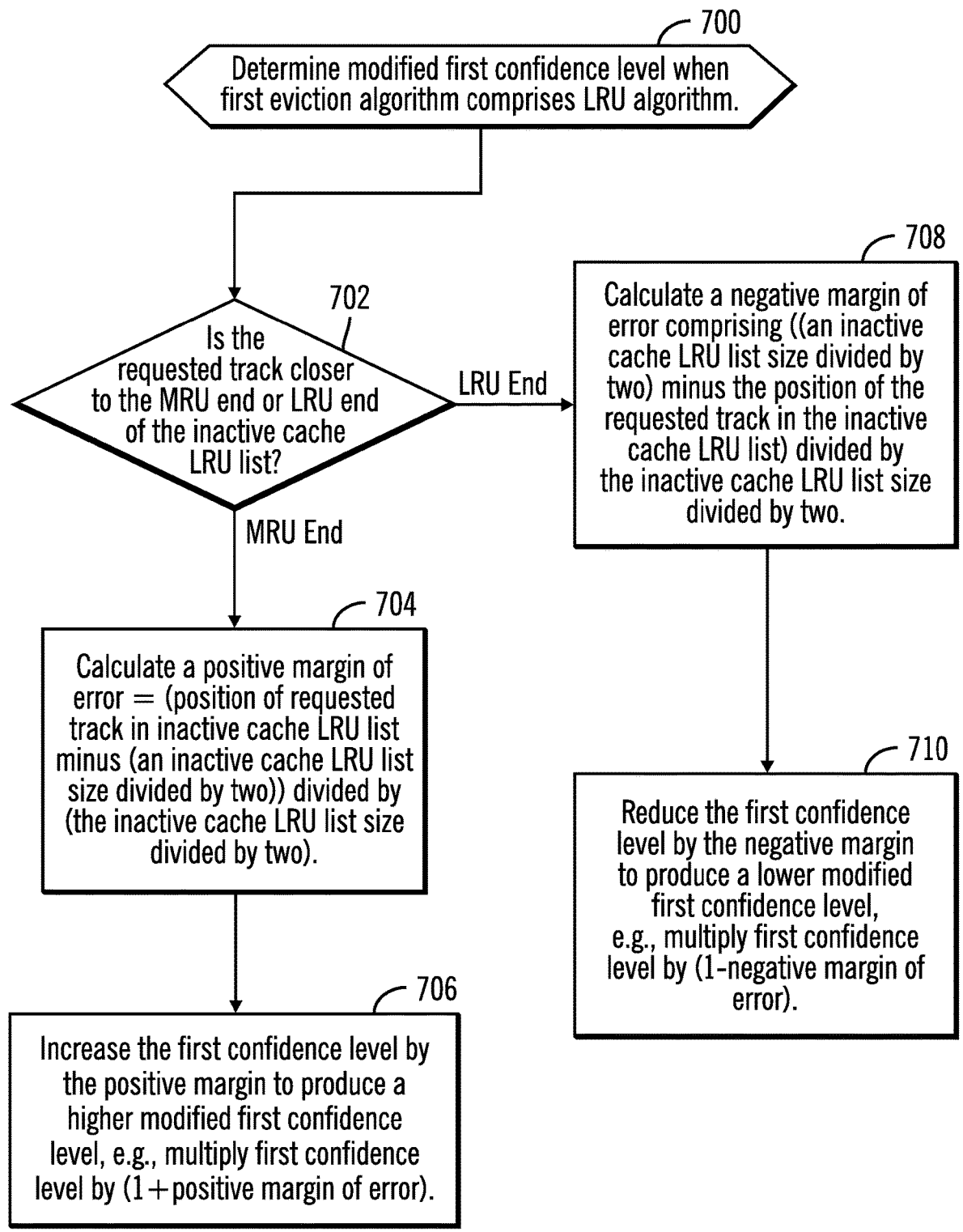
FIG. 7 illustrates an embodiment of operations to determine a modified confidence level for a LRU algorithm that should be output for the requested track if there is a read miss to the requested track.

FIG. 7 illustrates an embodiment of operations performed by the first machine learning module 132$_1$, or other component such as the cache manager 124, to calculate the modified first confidence level when the first eviction algorithm comprises an LRU algorithm, such as performed at block 606 in FIG. 6. Upon initiating the operation to calculate (at block 700) the modified first confidence level, if (at block 702) the requested track is closer to the MRU end 202 than the LRU end 204, i.e., has a better than average recent access, then the first machine learning module 132$_1$ calculates (at block 704) a positive margin of error as equal to:

(position of requested track in inactive cache list minus (an inactive cache list size divided by two)) divided by (the inactive cache list size divided by two).

The first machine learning module 132$_1$ increases (at block 706) the first confidence level by the positive margin to produce a higher modified first confidence level, e.g., multiply first confidence level by (1 plus positive margin of error).

If (at block 702) the requested track is closer to the LRU end 204, then the first machine learning module 132$_1$ calculates (at block 708) a negative margin of error as equal to:

((an inactive cache list size divided by two) minus the position of the requested track in the inactive cache list minus) divided by (the inactive cache list size divided by two)

The first machine learning module 132$_1$ reduces (at block 710) the first confidence level by the negative margin to produce a lower modified first confidence level, e.g., multiply first confidence level by (1 minus negative margin of error).

With the embodiment of operations of FIG. 7, the position of the requested track in the inactive LRU cache list 200$_{LA}$ is used to determine a margin of error for the first confidence level based on an extent to which the requested track resulting in the cache miss is in the upper or lower half of the inactive LRU cache list 200$_{LA}$. If the requested track is in the upper half of the inactive LRU cache list 200$_{LA}$, then the requested track was accessed more recently than the average track in the inactive LRU cache list 200$_{LA}$, and thus the LRU eviction algorithm should produce a higher confidence level for the requested track, i.e., more recently accessed means more likely to have read hits. If the requested track is in the lower half of the inactive LRU cache list 200$_{LA}$, then the requested track was accessed less recently than the average track in the inactive LRU cache list 200$_{LA}$, and thus the LRU eviction algorithm should produce a lower confidence level for the less recently accessed requested track, which is not likely to reduce cache misses.

Figure 8:
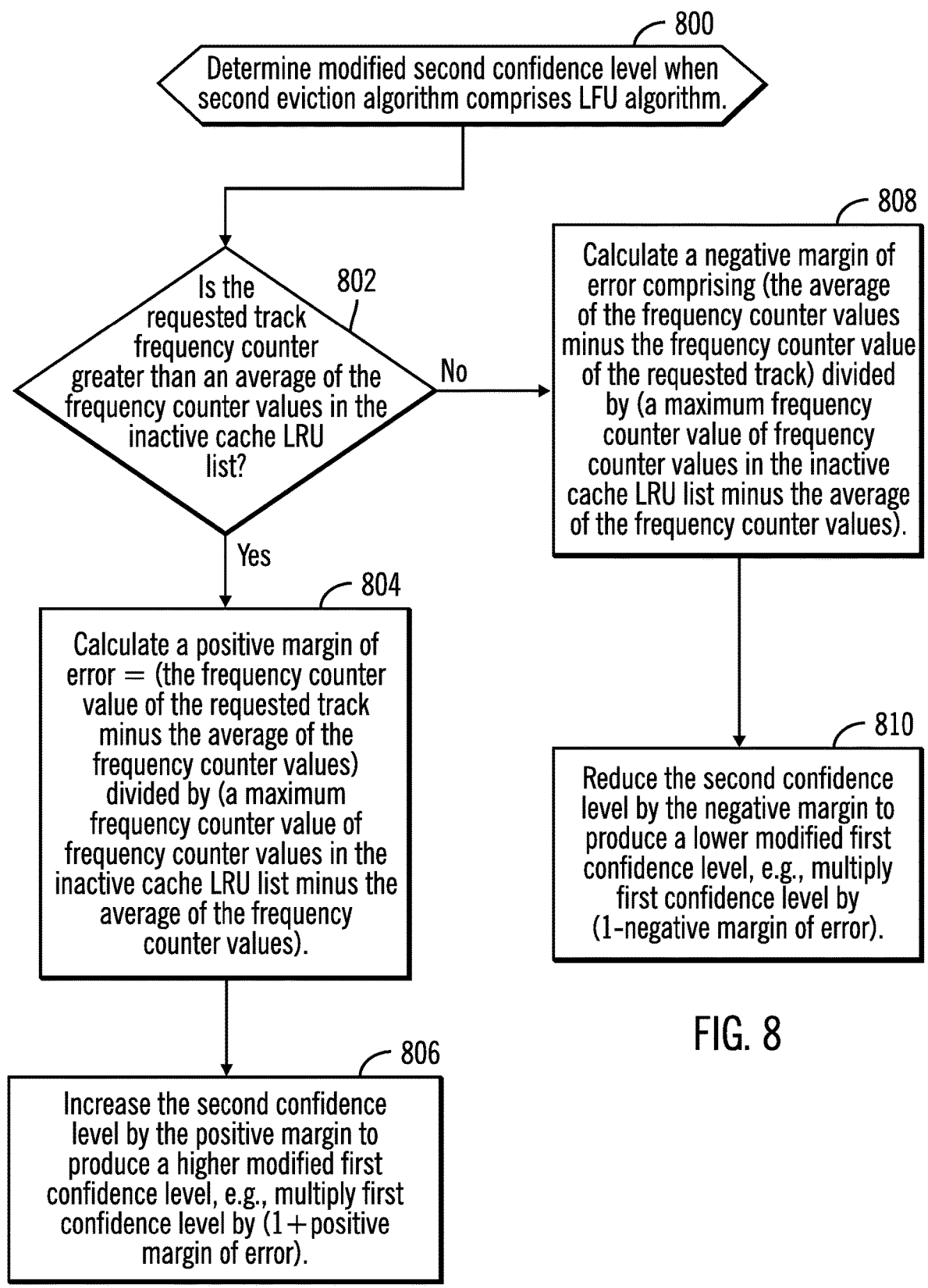
FIG. 8 illustrates an embodiment of operations to determine a modified confidence level for a Least Frequently Used (LFU) algorithm that should be output for the requested track if there is a read miss to the requested track.

FIG. 8 illustrates an embodiment of operations performed by the second machine learning module 132$_2$, or other component such as the cache manager 124, to calculate the modified second confidence level when the second eviction algorithm 130$_2$ comprises an LFU algorithm, such as performed at block 608 in FIG. 6. Upon initiating the operation to calculate (at block 800) the modified second confidence level, if (at block 802) the requested track frequency counter 312 is greater than an average of the frequency counter values 312 for the tracks in the inactive cache LRU list 200$_{LA}$, then the second machine learning module 132$_2$ calculates (at block 804) a positive margin of error as equal to:

(the frequency count value of the requested track minus the average of the frequency counter values) divided by (a maximum frequency counter value of frequency counter values in the inactive cache list minus the average of the frequency counter values)

The second machine learning module 132$_2$ increases (at block 806) the second confidence level by the positive margin to produce a higher modified second confidence level, e.g., multiply second confidence level by (1 plus positive margin of error).

If (at block 802) the requested track frequency counter 312 is less than an average of the frequency counter values 312 for the tracks in the inactive cache LRU list 200$_{LA}$, then the second machine learning module 132$_2$ calculates (at block 808) a negative margin of error as equal to:

(the average of the frequency counter values minus the frequency count value of the requested track) divided by (a maximum frequency counter value of frequency counter values in the inactive cache list minus the average of the frequency counter values).

The second machine learning module 132$_2$ decreases (at block 810) the second confidence level by the negative margin to produce a lower modified second confidence level, e.g., multiply second confidence level by (1 minus negative margin of error).

With the embodiment of operations of FIG. 8, the position of the access frequency of the requested track in the inactive LRU cache list 200$_{LA}$ is used to determine a margin of error for the second confidence level based on an extent to which the requested track resulting in the cache miss has a greater or less than average access frequency. If the requested track has a greater than average access frequency in the inactive LRU cache list 200$_{LA}$, then the requested track was accessed more frequency than most tracks in the inactive LRU cache list 200$_{LA}$, and thus the LFU eviction algorithm should produce a higher confidence level for the requested track, i.e., more read hits. If the requested track has a lower than average access frequency of the tracks in the inactive LRU cache list 200$_{LA}$, then the requested track was accessed less frequently than the average track in the inactive LRU cache list $200_{1A}$, and thus the LFU eviction algorithm should produce a lower confidence level for the less frequently accessed requested track and not contribute to a better cache hit-to-miss ratio.

In the described embodiment, variables "i", etc., when used with different elements may denote a same or different instance of that element.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 9:
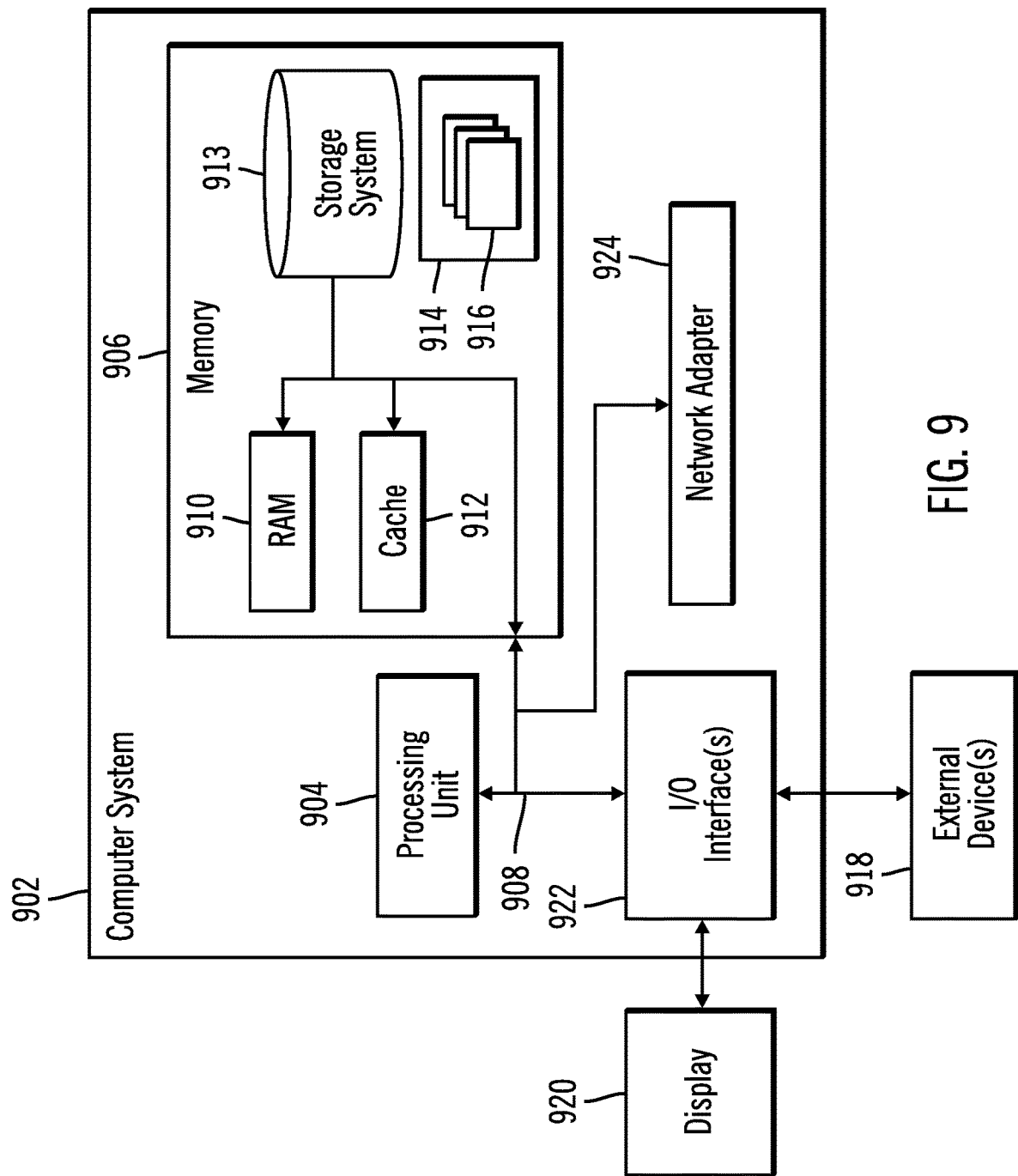
FIG. 9 illustrates a computing environment in which the components of FIG. 1 may be implemented.

The computational components of FIG. 1, including the hosts 118 and computing system 100 may be implemented in one or more computer systems, such as the computer system 902 shown in FIG. 9. Computer system/server 902 may be described in the general context of computer system executable instructions, such as program modules, being executed by a computer system. Generally, program modules may include routines, programs, objects, components, logic, data structures, and so on that perform particular tasks or implement particular abstract data types. Computer system/server 902 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, the computer system/server 902 is shown in the form of a general-purpose computing device. The components of computer system/server 902 may include, but are not limited to, one or more processors or processing units 904, a system memory 906, and a bus 908 that couples various system components including system memory 906 to processor 904. Bus 908 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 902 typically includes a variety of computer system readable media. Such media may be any available media that is accessible by computer system/server 902, and it includes both volatile and non-volatile media, removable and non-removable media.

System memory 906 can include computer system readable media in the form of volatile memory, such as random access memory (RAM) 910 and/or cache memory 912. Computer system/server 902 may further include other removable/non-removable, volatile/non-volatile computer system storage media. By way of example only, storage system 913 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 908 by one or more data media interfaces. As will be further depicted and described below, memory 906 may include at least one program product having a set (e.g., at least one) of program modules that are configured to carry out the functions of embodiments of the invention.

Program/utility 914, having a set (at least one) of program modules 916, may be stored in memory 906 by way of example, and not limitation, as well as an operating system, one or more application programs, other program modules, and program data. Each of the operating system, one or more application programs, other program modules, and program data or some combination thereof, may include an implementation of a networking environment. The components of the computer 902 may be implemented as program modules 916 which generally carry out the functions and/or methodologies of embodiments of the invention as described herein. The systems of FIG. 1 may be implemented in one or more computer systems 902, where if they are implemented in multiple computer systems 902, then the computer systems may communicate over a network.

Computer system/server 902 may also communicate with one or more external devices 918 such as a keyboard, a pointing device, a display 920, etc.; one or more devices that enable a user to interact with computer system/server 902; and/or any devices (e.g., network card, modem, etc.) that enable computer system/server 902 to communicate with one or more other computing devices. Such communication can occur via Input/Output (I/O) interfaces 922. Still yet, computer system/server 902 can communicate with one or more networks such as a local area network (LAN), a general wide area network (WAN), and/or a public network (e.g., the Internet) via network adapter 924. As depicted, network adapter 924 communicates with the other components of computer system/server 902 via bus 908. It should be understood that although not shown, other hardware and/or software components could be used in conjunction with computer system/server 902. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for demoting tracks from cache to a storage, the computer program product comprising a computer readable storage medium having computer readable program code embodied therein that when executed performs operations, the operations comprising:
   providing a first cache eviction algorithm to determine tracks to evict from the cache;
   providing a second cache eviction algorithm to determine tracks to evict from the cache, wherein the first and second cache eviction algorithms use different eviction schemes;
   executing a first machine learning module that outputs a first confidence level indicating a likelihood that the first cache eviction algorithm optimizes a read hit rate to the cache;
   executing a second machine learning module that outputs a second confidence level indicating a likelihood that the second cache eviction algorithm optimizes the read hit rate to the cache;
   evicting a first evict track, determined by the first cache eviction algorithm, from the cache in response to the first confidence level exceeding the second confidence level; and
   evicting a second evict track, determined by the second cache eviction algorithm, from the cache in response to the second confidence level exceeding the first confidence level.

2. The computer program product of claim 1, wherein the operations further comprise:
   providing a least recently used (LRU) list of tracks in the cache, wherein the first cache eviction algorithm comprises an LRU algorithm that selects a track to evict that is at an LRU end of the LRU list.

3. The computer program product of claim 2, wherein the operations further comprise:
   providing a frequency counter for each of the tracks in the LRU list indicating a number of times a track in the cache has been accessed while on the LRU list, wherein the second cache eviction algorithm comprises a Least Frequently Used (LFU) algorithm that selects a track to evict that has a lowest frequency counter of the frequency counters for the tracks in the cache.

4. The computer program product of claim 1, wherein the operations further comprise:
   executing the first cache eviction algorithm to determine the first evict track to evict from the cache;
   executing the second cache eviction algorithm to determine the second evict track to evict from the cache; and
   wherein the first machine learning module receives as input the first evict track and cache statistics to output the first confidence level and wherein the second machine learning module receives as input the second evict track and cache statistics to output the second confidence level.

5. A computer program product for demoting tracks from cache to a storage, the computer program product comprising a computer readable storage medium having computer readable program code embodied therein that when executed performs operations, the operations comprising:
   executing a first cache eviction algorithm to determine a first evict track to evict from the cache;
   executing a second cache eviction algorithm to determine a second evict track to evict from the cache, wherein the first and second cache eviction algorithms use different eviction schemes;
   executing at least one machine learning module that receives as input the first evict track, the second evict track and cache statistics and produces output used to select one of the first and the second cache eviction algorithms to use to select a track to evict from the cache;
   evicting the first evict track from the cache in response to the output from the at least one machine learning module indicating to use the first cache eviction algorithm; and
   evicting the second evict track from the cache in response to the output from the at least one machine learning module indicating to use the second cache eviction algorithm.

6. The computer program product of claim 5, wherein the cache statistics comprises at least one of a size of the cache, a cache miss-to-hit ratio, first access frequency of the first evict track for the first machine learning module and second access frequency of the second evict track for the second machine learning module, a first location of the first evict track in a least recently used (LRU) list for the first machine learning module and a second location of the second evict track in the LRU list for the second machine learning module.

7. The computer program product of claim 5, wherein the output from the at least one machine learning module comprises:
   a first confidence level indicating a likelihood that the first cache eviction algorithm optimizes a read hit rate to the cache;
   a second confidence level indicating a likelihood that the second cache eviction algorithm optimizes the read hit rate to the cache;
   wherein the output indicates to use the first cache eviction algorithm in response to the first confidence level exceeding the second confidence level; and
   wherein the output indicates to use the second cache eviction algorithm in response to the second confidence level exceeding the first confidence level.

8. The computer program product of claim 7, wherein the at least one machine learning module comprises a first machine learning module that receives as input the first evict track and outputs the first confidence level and a second machine learning module that receives as input the second evict track and outputs the second confidence level.

9. The computer program product of claim 8, wherein the operations further comprise:
   maintaining an active cache list of the tracks in the cache;
   maintaining an inactive cache list of tracks evicted from the cache;
   removing indication of a track from the active cache list when the track is evicted from the cache; and adding indication of the track evicted from the cache to the inactive cache list.

10. The computer program product of claim 9, wherein the active and inactive cache lists comprise least recently used (LRU) lists of tracks in the cache, wherein the first cache eviction algorithm comprises an LRU algorithm that selects a track to evict that is at an LRU end of the LRU list.

11. The computer program product of claim 9, wherein the operations further comprise:
providing a frequency counter for each of the tracks in the active and inactive cache lists indicating a number of times the track in the cache has been accessed while on the active cache list before being moved to the inactive cache list, wherein the second cache eviction algorithm comprises a Least Frequently Used (LFU) algorithm that selects a track to evict that has a lowest frequency counter of the frequency counters for the tracks in the cache.

12. A system for demoting tracks from cache to a storage, comprising:
a processor; and
a computer readable storage medium having computer readable program code embodied therein that when executed performs operations, the operations comprising:
providing a first cache eviction algorithm to determine tracks to evict from the cache;
providing a second cache eviction algorithm to determine tracks to evict from the cache, wherein the first and second cache eviction algorithms use different eviction schemes;
executing a first machine learning module that outputs a first confidence level indicating a likelihood that the first cache eviction algorithm optimizes a read hit rate to the cache;
evicting a first evict track, determined by the first cache eviction algorithm, from the cache in response to the first confidence level exceeding a second confidence level; and
evicting a second evict track, determined by the second cache eviction algorithm, from the cache in response to the second confidence level exceeding the first confidence level.

13. The system of claim 12, wherein the operations further comprise:
providing a least recently used (LRU) list of tracks in the cache, wherein the first cache eviction algorithm comprises an LRU algorithm that selects a track to evict that is at an LRU end of the LRU list.

14. The system of claim 12, wherein the operations further comprise:
executing the first cache eviction algorithm to determine a first evict track to evict from the cache;
executing the second cache eviction algorithm to determine a second evict track to evict from the cache; and
wherein the executed first machine learning module receives as input the first evict track and cache statistics to output the first confidence level and wherein a second machine learning module receives as input the second evict track and cache statistics to output the second confidence level.

15. A system for demoting tracks from cache to a storage, comprising:
a processor; and
a computer readable storage medium having computer readable program code embodied therein that when executed performs operations, the operations comprising:
executing a first cache eviction algorithm to determine a first evict track to evict from the cache;
executing a second cache eviction algorithm to determine a second evict track to evict from the cache, wherein the first and second cache eviction algorithms use different eviction schemes;
executing at least one machine learning module that receives as input the first evict track, the second evict track and cache statistics and produces output used to select one of the first and the second cache eviction algorithms to use to select a track to evict from the cache;
evicting the first evict track from the cache in response to the output from the at least one machine learning module indicating to use the first cache eviction algorithm; and
evicting the second evict track from the cache in response to the output from the at least one machine learning module indicating to use the second cache eviction algorithm.

16. The system of claim 15, wherein the output from the at least one machine learning module comprises:
a first confidence level indicating a likelihood that the first cache eviction algorithm optimizes a read hit rate to the cache;
a second confidence level indicating a likelihood that the second cache eviction algorithm optimizes the read hit rate to the cache;
wherein the output indicates to use the first cache eviction algorithm in response to the first confidence level exceeding the second confidence level; and
wherein the output indicates to use the second cache eviction algorithm in response to the second confidence level exceeding the first confidence level.

17. The system of claim 16, wherein the at least one machine learning module comprises a first machine learning module that receives as input the first evict track and outputs the first confidence level and a second machine learning module that receives as input the second evict track and outputs the second confidence level.

18. The system of claim 17, wherein the operations further comprise:
maintaining an active cache list of the tracks in the cache;
maintaining an inactive cache list of tracks evicted from the cache;
removing indication of a track from the active cache list when the track is evicted from the cache; and
adding indication of the track evicted from the cache to the inactive cache list.

19. A method for demoting tracks from cache to a storage, comprising:
providing a first cache eviction algorithm to determine tracks to evict from the cache;
providing a second cache eviction algorithm to determine tracks to evict from the cache, wherein the first and second cache eviction algorithms use different eviction schemes;
executing a first machine learning module that outputs a first confidence level indicating a likelihood that the first cache eviction algorithm optimizes a read hit rate to the cache;

executing a second machine learning module that outputs a second confidence level indicating a likelihood that the second cache eviction algorithm optimizes the read hit rate to the cache;

evicting a first evict track, determined by the first cache eviction algorithm, from the cache in response to the first confidence level exceeding the second confidence level; and evicting a second evict track, determined by the second cache eviction algorithm, from the cache in response to the second confidence level exceeding the first confidence level.

20. The method of claim 19, further comprising:
providing a least recently used (LRU) list of tracks in the cache, wherein the first cache eviction algorithm comprises an LRU algorithm that selects a track to evict that is at an LRU end of the LRU list.

21. The method of claim 19, further comprising:
executing the first cache eviction algorithm to determine a first evict track to evict from the cache;
executing the second cache eviction algorithm to determine a second evict track to evict from the cache; and
wherein the executed first machine learning module receives as input the first evict track and cache statistics to output the first confidence level and wherein the second machine learning module receives as input the second evict track and cache statistics to output the second confidence level.

22. A method for demoting tracks from cache to a storage, comprising:
executing a first cache eviction algorithm to determine a first evict track to evict from the cache;
executing a second cache eviction algorithm to determine a second evict track to evict from the cache, wherein the first and second cache eviction algorithms use different eviction schemes;
executing at least one machine learning module that receives as input the first evict track, the second evict track and cache statistics and produces output used to select one of the first and the second cache eviction algorithms to use to select a track to evict from the cache;
evicting the first evict track from the cache in response to the output from the at least one machine learning module indicating to use the first cache eviction algorithm; and
evicting the second evict track from the cache in response to the output from the at least one machine learning module indicating to use the second cache eviction algorithm.

23. The method of claim 22, wherein the output from the at least one machine learning module comprises:
a first confidence level indicating a likelihood that the first cache eviction algorithm optimizes a read hit rate to the cache;
a second confidence level indicating a likelihood that the second cache eviction algorithm optimizes the read hit rate to the cache;
wherein the output indicates to use the first cache eviction algorithm in response to the first confidence level exceeding the second confidence level; and
wherein the output indicates to use the second cache eviction algorithm in response to the second confidence level exceeding the first confidence level.

24. The method of claim 23, wherein the at least one machine learning module comprises a first machine learning module that receives as input the first evict track and outputs the first confidence level and a second machine learning module that receives as input the second evict track and outputs the second confidence level.

25. The method of claim 24, further comprising:
maintaining an active cache list of the tracks in the cache;
maintaining an inactive cache list of tracks evicted from the cache;
removing indication of a track from the active cache list when the track is evicted from the cache; and
adding indication of the track evicted from the cache to the inactive cache list.

* * * * *